US008794723B2

(12) United States Patent
Wakazono

(10) Patent No.: US 8,794,723 B2
(45) Date of Patent: Aug. 5, 2014

(54) MARKING DEVICE

(75) Inventor: Takehiko Wakazono, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/002,354

(22) PCT Filed: Feb. 27, 2012

(86) PCT No.: PCT/JP2012/001326
§ 371 (c)(1),
(2), (4) Date: Aug. 29, 2013

(87) PCT Pub. No.: WO2012/117716
PCT Pub. Date: Sep. 7, 2012

(65) Prior Publication Data
US 2013/0335502 A1    Dec. 19, 2013

(30) Foreign Application Priority Data

Mar. 1, 2011  (JP) .................................. 2011-043576

(51) Int. Cl.
*B41J 2/325* (2006.01)
*G01M 17/02* (2006.01)
(52) U.S. Cl.
CPC .............. *B41J 2/325* (2013.01); *G01M 17/024* (2013.01)
USPC .......................................... 346/141; 347/176
(58) Field of Classification Search
USPC .......... 346/139, 141; 347/171, 172, 174, 176; 400/120.01, 120.02, 120.04
See application file for complete search history.

(56) References Cited

U.S. PATENT DOCUMENTS

| 4,577,198 A * | 3/1986 | Hibino et al. ................ 347/197 |
| 2013/0229479 A1 * | 9/2013 | Wakazono et al. ........... 347/197 |

FOREIGN PATENT DOCUMENTS

| JP | 58-187395 | * 11/1983 | .................... 347/176 |
| JP | 61-029578 A | 2/1986 | |
| JP | 05-052697 A | 3/1993 | |
| JP | 2000-329658 A | 11/2000 | |
| JP | 2003-341206 A | 12/2003 | |
| JP | 2006-095738 A | 4/2006 | |
| WO | WO 92/22795 | * 12/1992 | ............. B60C 13/00 |

OTHER PUBLICATIONS

Computer-generated translation of JP 2000-329658, published on Nov. 2000.*
International Search Report; PCT/JP2012/001326; May 1, 2012.
Written Opinion of the International Searching Authority; PCT/JP2012/001326; May 1, 2012.

* cited by examiner

*Primary Examiner* — Huan Tran
(74) *Attorney, Agent, or Firm* — Studebaker & Brackett PC

(57) ABSTRACT

A marking head of a marking device comprises: at least one marking pin; a heater that heats the marking pin; a support base that supports a first marking tape and a second marking tape in such a manner that the first marking tape and the second marking tape line up in a direction orthogonal to the longitudinal direction of the marketing pin; a driving device that is capable of moving the support base to a first position at which the first marking tape faces the marking pin, and a second position at which the second marking tape faces the marking pin; and extrusion devices that extrude the marking pin out toward the marking tape facing the marking pin in order to press the marking tape facing the marking pin against a tire and print on the tire.

2 Claims, 3 Drawing Sheets

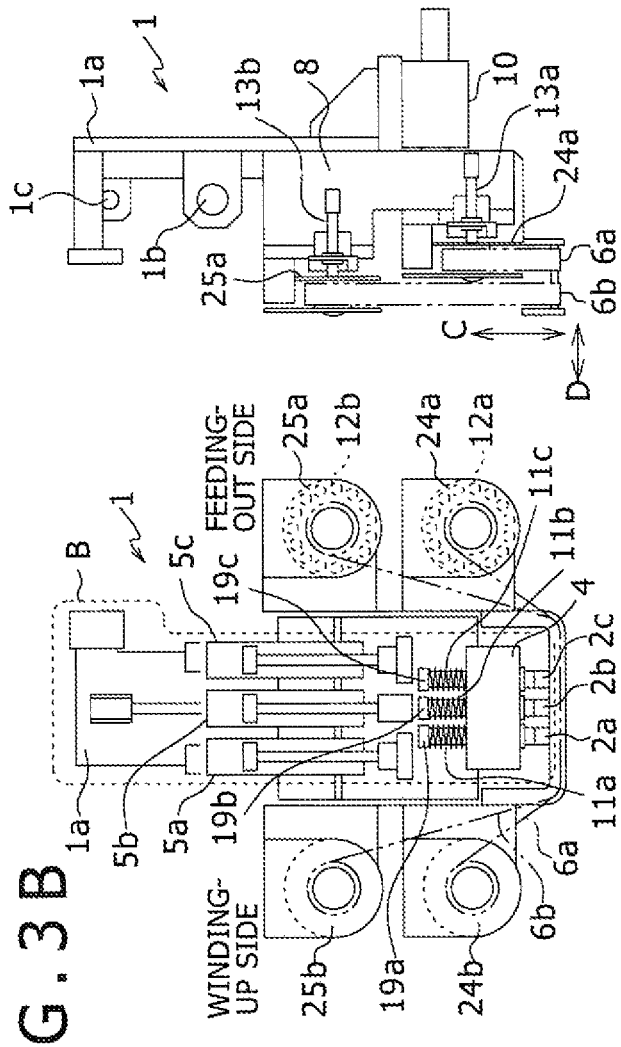

MARKING DEVICE

TECHNICAL FIELD

The present invention relates to a marking device that performs marking on a tire which has been subjected to a performance test.

BACKGROUND ART

Marking is performed on a tire which has been subjected to a performance test using a tire testing machine. In this marking process, a heated marking pin presses a marking tape against the tire, so that a desired mark is printed on the tire by a thermal transfer method.

Patent Document 1 discloses a marking device which disposes two adjacent tapes in a substantially circumferential direction (tangential direction) of a tire and assigns a separate marking pin to each of the two tapes so as to print two marks on the tire. In the marking device, the marks may be printed in different colors by causing the two tapes to have different colors.

However, it is difficult to use the marking device of Patent Document 1 for a case where a printable area on the surface of the tire is small because the two printing positions on the surface of the tire are different from each other in the circumferential direction. In addition, in a case where the marking is performed at the same positions of the same types of tires while switching the tapes in use, the position of the tire needs to be adjusted such that the printing position is positioned directly below the tape in use. For this reason, there is a need to perform control that adjusts a rotation stop position of a spindle or a rotation angle of the marking pin with respect to the tire in every tape in use.

Meanwhile, Patent Document 2 discloses a marking device which disposes two tapes in series in the radial direction of the tire. According to the configuration, when the marking is performed at the same positions of the same types of tires while switching the tapes in use, there is no need to adjust the position of the tire in the circumferential direction.

However, since a separate marking pin is assigned to each of two tapes, additional mechanisms (a driving mechanism, a temperature adjusting mechanism, and the like) are necessary for each marking pin, so that the marking device of Patent Document 2 has demerits in the complexity of the device and the production cost of the device. Furthermore, when the marking is performed on the same positions of the same types of tires while switching the tapes in use, there is a need to adjust the position of the tire in the radial direction such that the printing position is positioned directly below the tape in use. For this reason, there is a need to perform control which adjusts the tire stop position by a conveyor or the stop position of the marking device in the radial direction of the tire whenever switching

CITATION LIST

Patent Document

Patent Document 1: JP 2000-329658 A
Patent Document 2: JP 2006-95738 A

SUMMARY OF THE INVENTION

An object of the present invention is to provide a simplified marking device that is capable of performing marking on the same positions of the same types of tires while switching tapes in use.

A marking device according to the present invention includes a marking head which performs printing on a tire, and an approaching device which causes the marking head to approach the surface of the tire. The marking head includes: at least one marking pin, a heater which heats the marking pin, a support base which supports a first marking tape and a second marking tape such that the first marking tape and the second marking tape are disposed in series in a direction orthogonal to the longitudinal direction of the marking pin, a driving device capable of moving the support base to a first position at which the first marking tape faces the marking pin and to a second position at which the second marking tape faces the marking pin, and an extrusion device which extrudes the marking pin toward the marking tape facing the marking pin so as to press the marking tape facing the marking pin against the tire in order to perform the printing on the tire.

BRIEF DESCRIPTION OF DRAWINGS

FIG. 3(a) is a top view illustrating a marking head of the marking device, FIG. 3(b) is a front view illustrating the marking head, FIG. 3(c) is a side view illustrating the marking head, and FIG. 3(d) is a side view illustrating a main part B in FIG. 3(b).

DESCRIPTION OF EMBODIMENTS

Figure 1A:
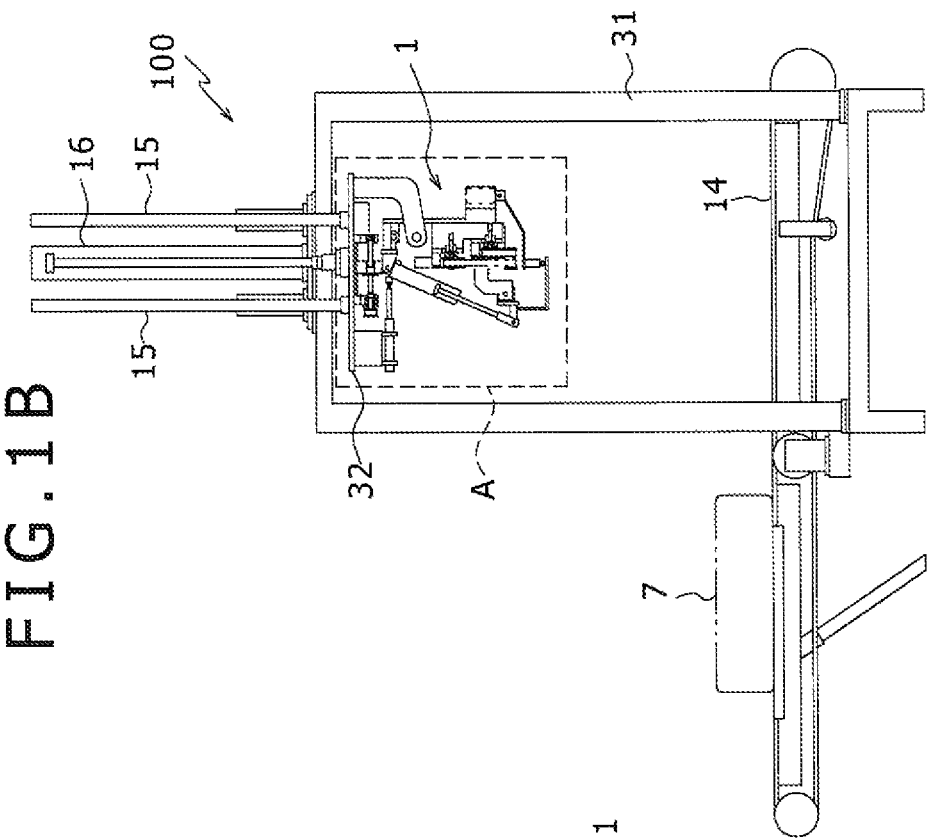
FIG. 1(a) is a front view illustrating a marking device according to an embodiment of the present invention and FIG. 1(b) is a side view illustrating the marking device.

Hereinafter, preferred embodiments of the present invention will be described by referring to the drawings.

(Configuration of Marking Device)

Figure 1B:
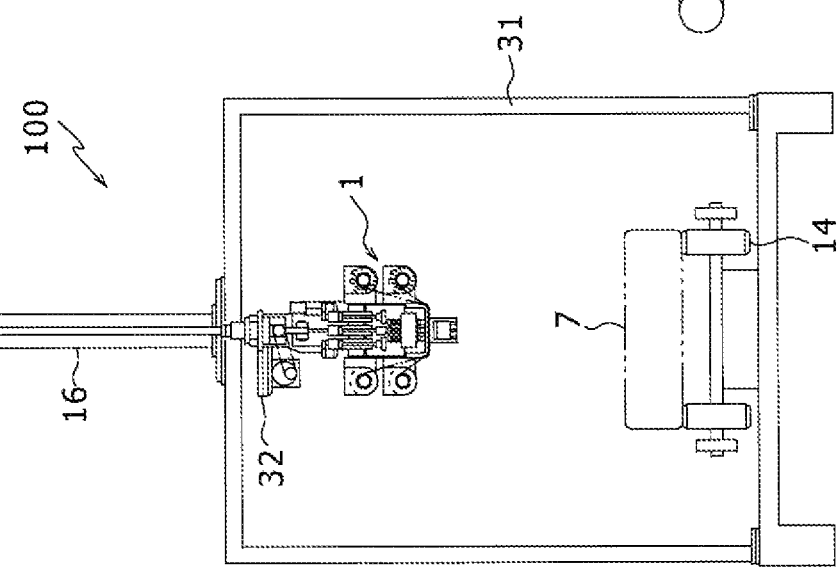

As illustrated in FIGS. 1(a) and 1(b), a marking device 100 according to an embodiment of the present invention includes a marking head 1 which performs printing on a tire 7, a conveyor 14 which conveys the tire 7, and an air cylinder (an approaching device) 16 which causes the marking head 1 to approach the surface of the tire 7.

The tire 7, which has been subjected to various performance tests by a tire testing machine (not illustrated), is delivered onto the conveyor 14 by a center conveyor (not illustrated). The marking head 1 which is supported by a lift frame 32 is disposed above the conveyor 14 for conveying the tire 7 so as to face the conveyor 14 in the vertical direction. The configuration of the marking head 1 will be described below.

The air cylinder 16 is uprightly provided on a frame 31, and elevates the lift frame 32 so as to move the marking head 1 in the vertical direction. As illustrated in the side view of the marking device 100 in FIG. 1(b), guide members 15 which guide the elevation of the lift frame 32 are respectively provided at the front and rear sides of the air cylinder 16 in the conveyance direction of the conveyor 14. These guide members 15 extend upward in relation to the frame 31.

The side wall of the tire 7 is disposed on the conveyor 14 to be faced upward. When printing a ark on the tire 7, the conveyor 14 conveys the tire 7 to reach under the marking head 1, and stops the tire 7 at a printing position. Then, the air cylinder 16 moves the marking head 1 down to an approaching position at which the marking head 1 is caused to approach the surface of the tire 7. Herein, the approaching position indicates a position at which the mark may be printed on the tire 7 when an cylinders (extrusion devices) 5a, 5b, and 5c to be described below extrude marking pins 2a, 2b, and 2c toward marking tapes 6a and 6b.

The stopping of the tire 7 at the printing position is appropriately controlled based on a conveyance distance of the tire 7 by the conveyor 14. For example, in a case where a sensor (not illustrated) is provided at a position (a conveyor passage position) where the tire 7 conveyed by the conveyor 14 passes so as to detect the rim of the tire 7, the conveyance distance is obtained by calculating the movement distance of the conveyor 14 from the position where the tire 7 is detected by the sensor. A controller (not illustrated) determines the size of the tire 7 in the radial direction based on the type information of the tire 7 to be conveyed by the conveyor 14. For example, the type of the tire 7 is determined by the detection of the tire 7 using sensors (not illustrated) on the conveyor 14, and the determined data is sent to the controller. Then, the tire 7 is accurately positioned at the printing position based on the passage information, the size information of the tire in the radial direction, and the movement distance of the conveyor 14 obtained, by the above-described sensor.

The air cylinder 16 is provided with a braking mechanism so that the an cylinder may be stopped in the middle of the stroke. The braking mechanism brakes the air cylinder 16 when the tire 7 comes into contact with a tire contact switch 17 to be described below (see FIG. 2).

Figure 2:
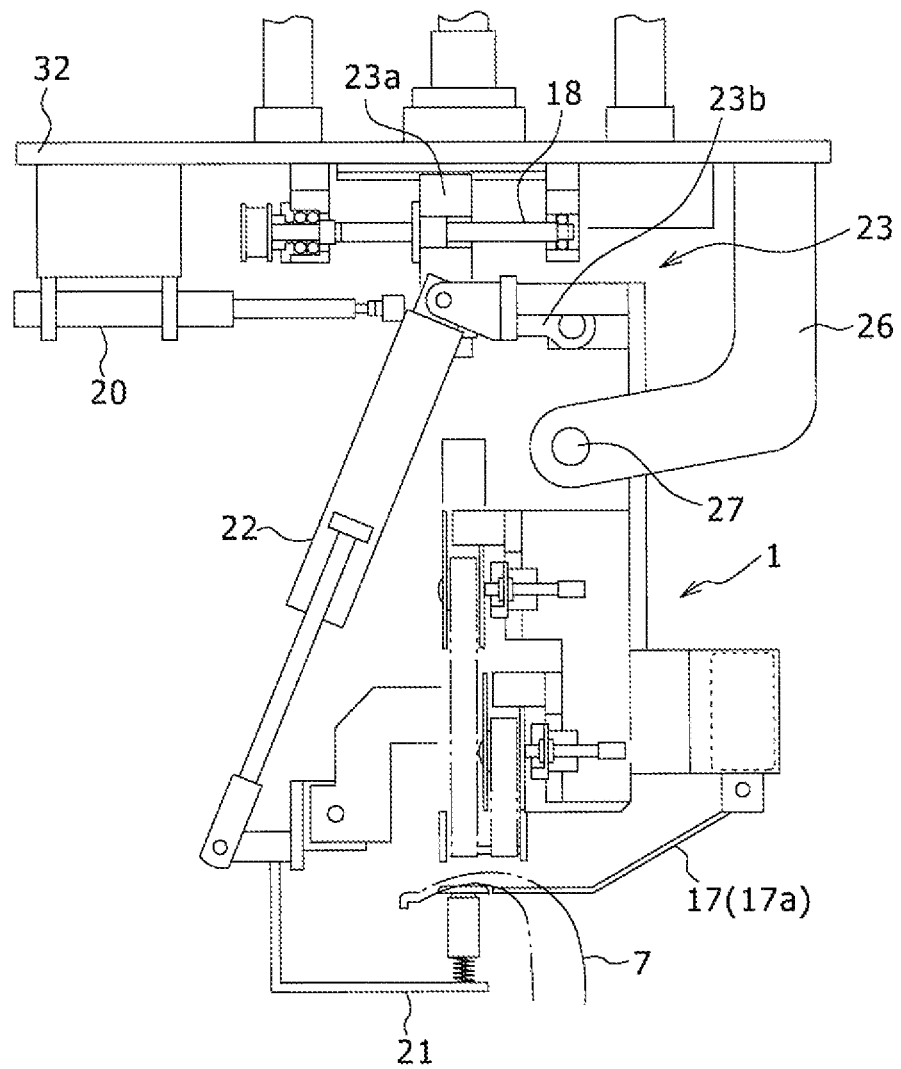
FIG. 2 is an enlarged view illustrating a main part A in FIG. 1(b).

As illustrated in FIG. 2 which is an enlarged view of a main part A in FIG. 1(b), the marking head 1 is attached to a rotation shaft 27 in a swingable manner, in which the rotation shaft is horizontally suspended between a pair of approximately L-shaped support frames 26 and 26 attached to the lift frame 32. In addition, an angle adjusting mechanism 23 which swings the marking head 1 and a linear sensor 20 which measures the angle of the marking head 1 are provided at the lower portion of the lift frame 32. The angle of the marking head 1 is adjusted by the angle adjusting mechanism 23 such that the mark is printed on the tire 7 at an appropriated angle.

The angle adjusting mechanism 23 includes a ball screw 18, a movable body 23a which horizontally moves along the conveyance direction of the conveyor 14 by a motor (not illustrated) rotating the ball screw 18 and a link member 23b which links the movable body 23a and the upper portion of the marking head 1 to each other.

In such a configuration, when the movable body 23a moves to the right side in FIG. 2, the upper portion of the marking head 1 moves to the right side by the link member 23b. Thus, the marking head 1 rotates in the clockwise direction about the rotation shaft 27, and the lower portion of the marking head 1 swings to the left upper side. In addition, when the movable body 23a moves to the left side in FIG. 2, the upper portion of the marking head 1 moves to the left side by the link member 23b. Thus, the marking head 1 rotates in the counter-clockwise direction about the rotation shaft 27, and the lower portion of the marking head 1 swings to the right upper side. The angle of the marking head 1 is measured by the linear sensor 20. Therefore, the angle of the marking head 1 is adjusted to an angle suitable for printing.

In addition, the tire contact switch 17 is provided in the lower portion of the marking head 1 to sense the contact with the tire 7. The tire contact switch 17 is provided with a rod-shaped body 17a and a limit switch (not illustrated). When the tip end of the rod-shaped body 17a comes into contact with the tire 7, the limit switch which is positioned at the base portion thereof is operated. When the limit switch is operated, the air cylinder 16 is braked to stop the operation of the air cylinder 16. Therefore, an appropriate distance is formed between the tire 7 and the marking head 1.

In addition, a support 21 is attached to the lower portion of the marking head 1 in a rotatable manner. The support 21 is used to press the tire 7 from the rear side thereof when the marking pins 2a, 2b, and 2c (see FIG. 3) press the tire 7, so that the tire 7 is prevented from being crushed. The marking head 1 is attached with an air cylinder 22 such that a rod thereof is inclined downward. The an cylinder 22 drives the support 21 to rotate.

(Configuration of Marking Head)

As illustrated in FIG. 3, the marking head 1 includes three marking pins 2a, 2b, and 2c, a heater 3 which applies heat to the marking pins 2a, 2b, and 2c, a support base 8 which supports two marking tapes 6a and 6b, an air cylinder (a driving device) 10 which moves the support base 8, and the air cylinders (the extrusion device) 5a, 5b, and 5c which extrude the marking pins 2a, 2b, and 2c toward the facing marking tapes 6a and 6b.

Herein, as illustrated in FIG. 3(c) which is a side view illustrating the marking head 1, the marking head 1 includes a main plate 1a to which the air cylinder 22 (see FIG. 2) is attached. The main plate 1a is provided with a hole 1b through which the rotation shaft 27 (see FIG. 2) passes and a hole 1c to which the link member 23b (see FIG. 2) is connected. The main plate 1a is provided with the marking pins 2a, 2b, and 2c, the heater 3, the air cylinder 10, and the air cylinders 5a, 5b, and 5c. The support base 8 which supports the two marking tapes 6a and 6b is adapted to be movable in a direction moving away from or closer to the main plate 1a by the air cylinder 10 that is provided in the main plate 1a.

As illustrated in FIG. 3(b) which is a front view illustrating the marking head 1, the marking pins 2a, 2b, and 2c are adapted to be movable forward or backward in the longitudinal direction. The tip ends of the marking pins 2a, 2b, and 2c may be formed in a shape such as a circle or a triangle according to a printing shape. As illustrated in FIG. 3(d) which is a side view of a main part B in FIG. 3(b), the heater 3 is capable of heating the marking pins 2a, 2b, and 2c by heating a block 4 into which the marking pin 2 (2a, 2b, and 2c) is inserted. With the heater 3, the marking pins 2a, 2b, and 2c are adjusted in a temperature suitable for the marking tapes 6a and 6b.

As illustrated in FIG. 3(c), the support base 8 supports the two marking tapes 6a and 6b. The two marking tapes 6a and 6b are disposed in series in the direction D orthogonal to the direction C, that is, the longitudinal direction of the marking pins 2a, 2b, and 2c. The marking tapes 6a and 6b are tapes coated with ink which will be transferred onto a target when heat is applied to the ink. In this embodiment, the marking tape 6a and the marking tape 6b are different from each other in color. The marking tape 6a is disposed closer to the air cylinder 10 (the inner side) in relation to the marking tape 6b. As illustrated in FIG. 3(b), the marking tape 6a is fed out of a feeding-out reel 24a which is disposed on the right side in relation to the marking pins 2a, 2b, and 2c in FIG. 3(b), and is wound on a winding-up reel 24b which is disposed on the left side in relation to the marking pins 2a, 2b, and 2c in FIG. 3(b). The winding-up reel 24b is driven to rotate by a motor 9a (see FIG. 3(a)). The marking tape 6b is fed out of a feeding-out reel 25a which is disposed on the right side in relation to the marking pins 2a, 2b, and 2c in FIG. 3(b), and is wound on a winding-up reel 25b which is disposed on the left side in relation to the marking pins 2a, 2b, and 2c in FIG. 3(b). The winding-up reel 25b is driven to rotate by a motor 9b (see FIG. 3(a)).

The feeding-out reel 24a includes a circular plate 12a, and a proximity switch 13a (see FIG. 3(c)) is provided near the feeding-out reel 24a. In addition, the feeding-out reel 25a includes a circular plate 12b, and a proximity switch 13b (see FIG. 3(c)) is provided near the feeding-out reel 25a. A plurality of through holes is provided near the outer peripheral of the circular plates 12a and 12b. While the circular plates 12a and 12b rotate as the marking tapes 6a and 6b are fed out, the proximity switches 13a and 13b are turned on and off whenever the through hole near the outer peripheral passes the proximity switches 13a and 13b. In this way, the rotation of the circular plates 12a and 12b is detected. Therefore, it is possible to monitor the amounts of the marking tapes 6a and 6b fed out and the cutting of the tapes. Since the winding is performed by the winding-up reels 24b and 25b, when the rotation of the feeding-out reels 24a and 25a is not detected, the cutting of the tapes may be detected.

As illustrated in FIG. 3(c), the air cylinder 10 is connected to the support base 8. The air cylinder 10 is adapted to move the support base 8 to a first position and a second position. The first position is a position at which the marking tape 6a (the first marking tape 6a) faces the marking pins 2a, 2b, and 2c. The second position is a position at which the marking tape 6b (the second marking tape 6b) faces the marking pins 2a, 2b, and 2c. The air cylinder 10 includes a rod which is extendable in a direction where the support base 8 is directed from the first position to the second position and in an opposite direction thereof. The rod is connected to the support base 8.

Specifically, in this embodiment, the air cylinder 10 moves the support base 8 in the direction D to cause any one of the two marking tapes 6a and 6b to face the marking pins 2a, 2b, and 2c in the direction C. When the stroke amount of the air cylinder 10 is at its maximum state, the marking tape 6a on the inner side (the right side in FIG. 3(c)) faces the marking pins 2a, 2b, and 2c.
Meanwhile, when the stroke amount of the air cylinder 10 is at its minimum state, the marking tape 6b on the front side (the left side in FIG. 3(c)) faces the marking pins 2a, 2b, and 2c. In addition, in this embodiment, the an cylinder 10 is an air cylinder with a guide which moves the support base 8 in the direction D while guiding the support base 8 in the direction D by the guide.

As illustrated in FIG. 3(b), when the rod is extended, the air cylinders 5a, 5b, and 5c extrude the corresponding marking pins 2a, 2b, and 2c toward the facing marking tapes 6a and 6b. Thus, the marking pins 2a, 2b, and 2c are pressed toward the facing marking tapes 6a and 6b. Specifically, the air cylinder 5a extrudes the marking pin 2a toward the facing marking tapes 6a and 6b, the air cylinder 5b extrudes the marking pin 2b toward the facing marking tapes 6a and 6b, and the air cylinder 5c extrudes the marking pin 2c toward the facing marking tapes 6a and 6b. Then, the rod of the air cylinder which satisfies a printing condition among the air cylinders 5a, 5b, and 5c is extended, and the marking pin corresponding to the air cylinder is pressed toward the marking tapes 6a and 6b, so that the marking tapes 6a and 6b is pressed against the tire 7 to perform printing on the tire 7.

The marking pins 2a, 2b, and 2c are inserted into coil springs 11a, 11b, and 11c, and include upper ends 19a, 19b, and 19c of which the diameters are larger than those of the coil springs 11a, 11b, and 11c. The coil springs 11a, 11b, and 11c are disposed in a telescopic manner between the block 4 and the upper ends 19a, 19b, and 19c of the marking pins 2a, 2b, and 2c. When the rods of the air cylinders 5a, 5b, and 5c are extended so that the marking pins 2a, 2b, and 2c are pressed against the marking tapes 6a and 6b, the upper ends 19a, 19b, and 19c of the marking pins 2a, 2b, and 2c approach the block 4, so that the coil springs 11a, 11b, and 11c are compressed. Thereafter, when the rods of the extended air cylinders 5a, 5b, and 5c are retracted to their original positions, the compressed coil springs 11a, 11b, and 11c are expanded, so that the upper ends 19a, 19b, and 19c of the marking pins 2a, 2b, and 2c are separated from the block 4. Therefore, the marking pins 2a, 2b, and 2c which are pressed against the marking tapes 6a and 6b are returned from the marking tapes 6a and 6b to the original positions.

(Operations of Marking Device)

Next, the marking operation of the marking device 100 performed on the tire 7 will be described. Further, the operation of each part of the marking device 100 to be described below is controlled by a controller (not illustrated) of a tire testing system which is equipped with the marking device 100.

First, as illustrated in FIG. 1, the marking head 1 is disposed at the original position above the printing position in the vertical direction due to the retraction of the air cylinder 16. Thereafter, the tire 7 is conveyed by the conveyor 14 down to the marking head 1, and is stopped at the printing position.

Next, as illustrated in FIG. 2, the angle adjusting mechanism 23 adjusts the angle of the marking head 1.

Thereafter, as illustrated in FIG. 3, a desired marking tape among the two marking tapes 6a and 6b is disposed to face the marking pins 2a, 2b, and 2c due to the extending or shortening of the air cylinder 10. In other words, when the rod of the air cylinder 10 is extended until the stroke amount of the air cylinder 10 becomes maximum in a case where the marking tape 6a is used, the marking tape 6a on the inner side is disposed to face the marking pins 2a, 2b, and 2c. Meanwhile, when the rod of the air cylinder 10 is shortened until the stoke of the an cylinder 10 becomes minimal in a case where the marking tape 6b is used, the marking tape 6b on the front side is disposed to face the marking pins 2a, 2b, and 2c.

Thereafter, as illustrated in FIG. 1, the marking head 1 moves down due to the extension of the rod of the air cylinder 16. When the rod-shaped body 17a (see FIG. 2) of the tire contact switch 17 comes into contact with the tire 7, the an cylinder 16 is braked, so that an appropriate distance is formed between the tire 7 and the marking head 1. Then, as illustrated in FIG. 2, the rear side of the tire 7 is pressed by the support 21 due to the driving of the air cylinder 22.

Thereafter, as illustrated in FIG. 3, a desired marking pin among the three marking pins 2a, 2b, and 2c is extruded toward the marking tape by the corresponding air cylinder, and is pressed against a desired marking tape. Accordingly, since the marking tape is pressed against the tire 7, a desired mark is printed on the side wall of the tire 7.

In this way, by employing the configuration in which the marking pins 2a, 2b, and 2c are commonly used for the two marking tapes 6a and 6b and the marking tapes to be disposed to face these marking pins 2a, 2b, and 2c are switched, each of the two marking tapes 6a and 6b is pressed against the tire 7 by the common marking pins 2a, 2b, and 2c. Therefore, since there is no need to provide the marking pins and additional mechanisms, such as a heater for heating the pins, for all the marking tapes 6a and 6b, it is possible to simplify the device. In addition, since the positions of the marking pins 2a, 2b, and 2c are not changed even after the marking tapes in use is switched, the positions under the marking pins 2a, 2b, and 2c are maintained as the printing positions all the time. Accordingly, in this embodiment, when the marking is performed on the same positions of the same types of tires 7, there is no need to adjust the positions of the tires 7 in the circumferential direction and the radial direction, so that the printing may be performed on the same positions of the same types of tires 7 by switching the marking tapes in use. Such marking on the same position may be preferably employed even in a low-profile tire having a narrow printable area or an intricately patterned tire.

In addition, it is possible to selectively use two types of the marking tapes 6a and 6b only by selecting any one of the maximum and minimum stroke amount of the air cylinder 10. For this reason, there is no need to provide a complicated stopping mechanism.

As described above, when the mark is printed on the side wall of the tire 7, the rod of the air cylinder which is extruding the marking pin is returned to the original position. Therefore, the marking pin which has been extruded is returned to the original position by the force of the coil spring 11. In addition, the support 21 which is extruding the rear side of the tire 7 is separated from the tire 7. Thereafter, the air cylinder 16 is retracted, and thus the marking head 1 is returned to the original position above the printing position in the vertical direction. In addition, the used marking tape is wound on the winding-up reel by a predetermined amount by rotating the winding-up reel to wind the used marking tape. Therefore, it becomes a standby state in which the marking operation may be performed on the next tire 7. Then, the above-described operations are repeatedly performed.

(Effects)

As described above, in the marking device 100 according to an embodiment of the present invention, the support base 8 which supports the two marking tapes 6a and 6b is moved in the direction D orthogonal to the direction C, which is the longitudinal direction of each of the marking pins 2a, 2b, and 2c, so as to cause any one of the two marking tapes 6a and 6b to face the marking pins 2a, 2b, and 2c. Then, the marking pins 2a, 2b, and 2c press the facing marking tape, so that a mark with a color corresponding to the marking tape is printed on the tire 7. In this way, with the configuration in which the marking pins 2a, 2b, and 2c are commonly used for the two marking tapes 6a and 6b and the marking tapes to be disposed to face these marking pins 2a, 2b, and 2c are switched, each of the two marking tapes 6a and 6b is pressed against the tire 7 by the common marking pins 2a, 2b, and 2c. Therefore, since there is no need to provide the marking pins and additional mechanisms, such as a heater for heating the pins, for all marking tapes 6a and 6b, it is possible to simplify the device.

In addition, since the positions of the marking pins 2a, 2b, and 2c are not changed even in a case where the marking tapes in use is switched, the position under the marking pins 2a, 2b, and 2c is maintained as the printing position all the time. Accordingly, in this embodiment, when the marking is performed on the same positions of the same types of tires 7, there is no need to adjust the positions of the tires 7 in the circumferential direction and the radial direction, so that the printing may be performed on the same positions of the same types of tires 7 by switching the marking tapes in use.

In addition, it is possible to selectively use two types of the marking tapes 6a and 6b only by selecting any one of the maximum and minimum stroke amount of the air cylinder 10.

Further, the specific embodiment described above includes inventions having configurations as described below.

A marking device according to an embodiment of the present invention includes a marking head which performs printing on a tire, and an approaching device which causes the marking head to approach the surface of the tire. The marking head includes: at least one marking pin, a heater which heats the marking pin, a support base which supports a first marking tape and a second marking tape such that the first marking tape and the second marking tape are disposed in series in a direction orthogonal to the longitudinal direction of the marking pin, a driving device capable of moving the support base to a first position at which the first marking tape faces the marking pin and to a second position at which the second marking tape faces the marking pin, and an extrusion device which extrudes the marking pin toward the marking tape facing the marking pin so as to press the marking tape facing the marking pin against the tire in order to perform the printing on the tire.

In this configuration, the support base which supports the first marking tape and the second marking tape is moved toward the first position so as to face the marking pin of the first marking tape, and the support base is moved toward the second position so as to face the marking pin of the second marking tape. Then, the marking pin is pressed against the marking tape facing the marking pin, so that the marking tape is pressed against the tire. Therefore, a mark with a color corresponding to the marking tape is printed on the tire. In this way, with the configuration in which the marking pins are commonly used for a plurality of marking tapes and the marking tape to be disposed to face the marking pins are switched, each of the plurality of marking tapes is pressed against the tire by the common marking pins. Therefore, since there is no need to provide the marking pins and additional mechanisms, such as a heater for heating the pins, for all marking tapes, it is possible to simplify the device.

In addition, in the configuration, since the positions of the marking pins are not changed even in a case where the marking tapes (the marking tapes to be disposed to face the marking pin) in use is switched, the position below the marking pins is maintained as the printing position all the time. Therefore, in the configuration, when the marking is performed on the same positions of the same types of tires, there is no need to adjust the positions of the tires in a circumferential direction and a radial direction, and the tires of the same type may be marked at the same positions by switching the marking tapes in use. In addition, in a case where marking tapes with different colors are included in the plurality of the marking tapes, the marking may be performed in different colors. In addition, in a case where the marking tapes with the same color are included in the plurality of the marking tapes, the tape replacement frequency may be decreased.

In addition, in the marking device, the driving device includes a cylinder which is extendable in a direction where the support base is directed from the first position to the second position and in an opposite direction thereof. The cylinder is connected to the support base. When the cylinder stroke amount is maximum, the support base is positioned at the first position and the first marking tape faces the marking pin. Meanwhile, when the cylinder stroke amount is minimum, the support base is positioned at the second position and the second marking tape faces the marking pin. According to the above-described configuration, it is possible to selectively use the first marking tape and the second marking tape only by selecting any one of the maximum and minimum stroke amount of the cylinder.

Modified Examples of Embodiments

While embodiments of the present invention have been described above, these are merely specific examples. In particular, the present invention is not limited to these embodiments, and the specific configurations and the like may be appropriately modified in design. In addition, the operations and the effects described in these embodiments are merely operations and effects which are most appropriately obtained by the present invention, and the operations and the effects obtained by the present invention are not limited to those described in these embodiments of the present invention.

For example, the above embodiment has been described in connection with the case where the marking tape 6a and the marking tape 6b have different colors, but these two colors may be equal to each other. In this case, for example, the other marking tape 6b may be used after using up one marking tape 6a, it is possible to decrease the tape replacement frequency to a half compared to the marking head which is adapted to mount only one marking tape thereon.

In addition, the number of marking tapes is not limited to two, but three or more tapes may be employed. In this case, the stroke amount of the air cylinder (the driving device) 10 may be adjusted in multiple steps so as to cause the marking tapes in use to face the marking pins 2a, 2b, and 2c.

In addition, while the air cylinder 10 with a guide has been described as an example of the driving device in the above embodiment, the guide and the air cylinder may be separately configured. In addition, an electric cylinder may be used instead of the air cylinder. Besides, a driving device using a motor and a rack-and-pinion, and a driving device using a motor, a linear motion guide, and a ball screw may also be used.

REFERENCE NUMERALS

1 Marking head
1a Main plate
2a, 2b, 2c Marking pin
3 Heater
4 Block
5a, 5b, 5c Air cylinder
6a, 6b Marking tape
7 Tire
8 Support base
9a, 9b Motor
10 Air cylinder
11a, 11b, 11c Coil spring
12a, 12b Circular plate
13a, 13b Proximity switch
14 Conveyer
15 Guide member
16 Air cylinder
17 Tire contact switch
18 Ball screw
20 Linear sensor
21 Support
22 Air cylinder
23 Angle adjusting mechanism
24a, 25a Feeding-out reel
24b, 25b Winding-up reel
26 Support frame
27 Rotation shaft
31 Frame
32 Lift frame
100 Marking device

The invention claimed is:
1. A marking device comprising:
a marking head which performs printing on a tire; and
an approaching device which causes the marking head to approach a surface of the tire;
the marking head including:
at least one marking pin,
a heater which heats the marking pin,
a support base which supports a first marking tape and a second marking tape such that the first marking tape and the second marking tape are disposed in series in a direction orthogonal to the longitudinal direction of the marking pin,
a driving device capable of moving the support base to a first position at which the first marking tape faces the marking pin and to a second position at which the second marking tape faces the marking pin, and
an extrusion device which extrudes the marking pin toward the marking tape facing the marking pin so as to press the marking tape facing the marking pin against the tire in order to perform the printing on the tire.
2. The marking device according to claim 1, wherein the driving device includes a cylinder which is extendable in a direction where the support base is directed from the first position to the second position, and in an opposite direction thereof,
wherein the cylinder is connected to the support base, and
wherein when the stroke amount of the cylinder maximum, the support base is positioned at the first position and the first marking tape faces the marking pin, and when the stroke amount of the cylinder is minimum, the support base is positioned at the second position and the second marking tape faces the marking pin.

* * * * *